United States Patent
Murray et al.

(10) Patent No.: US 9,485,420 B2
(45) Date of Patent: Nov. 1, 2016

(54) VIDEO IMAGING USING PLURAL VIRTUAL IMAGE CAPTURE DEVICES

(71) Applicant: POINT GREY RESEARCH INC., Richmond (CA)

(72) Inventors: Donald Ray Murray, Vancouver (CA); Vladimir Tucakov, Vancouver (CA); Michael Charles Park, Bend, OR (US)

(73) Assignee: Point Grey Research Inc., Richmond (CA)

( * ) Notice: Subject to any disclaimer, the term of this patent is extended or adjusted under 35 U.S.C. 154(b) by 24 days.

(21) Appl. No.: 14/313,110

(22) Filed: Jun. 24, 2014

(65) Prior Publication Data

US 2015/0222812 A1    Aug. 6, 2015

Related U.S. Application Data

(60) Provisional application No. 61/935,267, filed on Feb. 3, 2014.

(51) Int. Cl.
*H04N 5/232* (2006.01)

(52) U.S. Cl.
CPC .......... *H04N 5/23225* (2013.01); *H04N 5/232* (2013.01)

(58) Field of Classification Search
CPC .................. G08B 13/196; G06T 2207/30232; H04N 7/18; G06K 9/00771
USPC ........................................................ 348/143
See application file for complete search history.

(56) References Cited

U.S. PATENT DOCUMENTS

| | | | |
|---|---|---|---|
| 7,496,291 B2 | 2/2009 | Bloom et al. | |
| 2004/0201677 A1* | 10/2004 | Bronson | 348/207.1 |
| 2004/0212678 A1* | 10/2004 | Cooper et al. | 348/155 |
| 2005/0285941 A1* | 12/2005 | Haigh et al. | 348/155 |
| 2006/0164514 A1* | 7/2006 | Muramatsu | B60R 1/00 348/207.99 |
| 2007/0025727 A1* | 2/2007 | Matusik et al. | 396/505 |
| 2007/0076312 A1* | 4/2007 | Jordan | 360/32 |
| 2010/0165112 A1* | 7/2010 | Scanlon et al. | 348/169 |
| 2011/0273570 A1* | 11/2011 | Sakaki | 348/207.11 |
| 2012/0051712 A1* | 3/2012 | Furumoto | 386/224 |
| 2012/0105632 A1* | 5/2012 | Renkis | 348/143 |
| 2012/0133777 A1* | 5/2012 | Khawand | H04N 5/145 348/169 |

(Continued)

OTHER PUBLICATIONS

Maurer, M. et al., "Airborne Inspection using Single-Camera Interleaved Imagery", 17th Computer Vision Winter Workshop, Slovenia, Feb. 1-3, 2012.

(Continued)

*Primary Examiner* — Shahbaz Nazrul
(74) *Attorney, Agent, or Firm* — Oyen Wiggs Green & Mutala LLP

(57) ABSTRACT

An image capture system and method wherein an image capture device has a plurality of virtual image capture devices and is configured to capture images according to a selected virtual image capture device. The selection of virtual image capture devices may vary with time, the number of images taken, or the occurrence of certain events. Images may be communicated over a data link to one or more processors, which may display the images to users. Users may add, edit or delete profiles, causing corresponding changes to virtual imaging devices. Virtual image capture devices may communicate with each other and may be configured to capture images based on analysis of images taken by other virtual capture devices.

74 Claims, 3 Drawing Sheets

(56) References Cited

U.S. PATENT DOCUMENTS

| | | | |
|---|---|---|---|
| 2013/0083196 A1* | 4/2013 | Zheng | 348/148 |
| 2013/0107070 A1* | 5/2013 | Hsu et al. | 348/220.1 |
| 2014/0009608 A1* | 1/2014 | Heier | 348/143 |
| 2014/0028792 A1* | 1/2014 | Abe | 348/37 |
| 2015/0312475 A1* | 10/2015 | Dinev | H04N 5/23225 348/222.1 |
| 2016/0073015 A1* | 3/2016 | Bressler | H04N 5/23225 348/211.6 |
| 2016/0198081 A1* | 7/2016 | Thomas | H04N 5/23206 348/211.3 |

OTHER PUBLICATIONS

GenICam Standard Features Naming Convention Version 2.0, Oct. 25, 2012.
GenICam Standard Features Naming Convention Sequencer Proposal, Jun. 6, 2013.
IPNetCam Reference Design on DM36x—AVServer Design Guide IPNC DM36x, Texas Instruments Incorporated 2009.
Universal Serial Bus Device Class Definition for Video Devices, Revision 1.5, Aug. 9, 2012.

* cited by examiner

VIDEO IMAGING USING PLURAL VIRTUAL IMAGE CAPTURE DEVICES

CROSS REFERENCE TO RELATED APPLICATION

This application claims the benefit under 35 U.S.C. §119 of U.S. Application No. 61/935,267 filed 3 Feb. 2014 and entitled VIRTUAL IMAGE CAPTURE SYSTEMS AND METHODS which is hereby incorporated herein by reference for all purposes.

TECHNICAL FIELD

This invention relates to digital photography. Embodiments provide imaging systems having application, for example, in security, monitoring, and the like.

BACKGROUND

Cameras and other image capture devices are commonly used to capture images of a subject area for security, monitoring, or other purposes. These images are typically stored for later access, processed to extract information, streamed to a remote user for viewing, or some combination thereof.

A given subject area may not be uniform in its lighting or in other photographic characteristics. As a result, a common problem is that some portions of an image of the subject area may not be fully exposed, may be overexposed, may appear blurry (for example, if the subject is in motion), or may otherwise be unsuitable for viewing. Furthermore, images optimized for one purpose may be non-optimal for other purposes.

Further, a viewers' interest may be limited to only a subset of the subject area, or perhaps to several discrete regions within the field of view of an image.

Issues with exposure can sometimes be addressed using high dynamic range (HDR) photography. HDR photography is done by combining multiple images that are identical, other than a variation in exposure between them. These images are combined into a format which can represent a wider range of exposure than is represented in any one of the original images.

There remains a need for image capture apparatus, systems and methods that ameliorate at least some of the shortcomings of the above-described devices and techniques.

SUMMARY

This invention has several aspects. One aspect provides an image capture device. The image capture device, according to some embodiments, includes a sensor configured to capture image data according to one or more imaging parameters, a controller in communication with the sensor, a memory accessible by the controller, and a plurality of virtual image capture devices represented in the memory. Each virtual image capture device of the plurality of virtual image capture devices is associated with a set of imaging parameters. In some embodiments, each virtual image capture device is associated with an internal state buffer. In some embodiments, the image capture device has a data link for communicating over a network.

In some embodiments, the controller is configured to instruct the sensor to capture image data at a first time according to at least one imaging parameter of a first set of imaging parameters associated with a first virtual image capture device of the plurality of virtual image capture devices, and the controller is configured to instruct the sensor to capture image data at a second time according to at least one imaging parameter of a second set of imaging parameters associated with a second virtual image capture device of the plurality of virtual image capture devices.

In some embodiments, the controller is configured to capture sets of image data with each of the virtual image capture devices. Capturing a set of image data can comprise instructing the sensor to capture image data according to at least one imaging parameter of the set of imaging parameters associated with the virtual image capture device. The image data may also be captured according to information stored in an internal state buffer associated with the virtual image capture device. The controller may be configured to store information associated with at least a portion of the captured set of image data in the internal state buffer associated with the virtual image capture device.

In some embodiments, the controller is configured to communicate identifiers associated with the each of the virtual image capture devices to the network. The identifier for each of the virtual image capture devices may be different from the identifiers for others of the virtual image capture devices.

An aspect of some embodiments of the invention comprises a scheduler configured to select the first virtual image capture device at the first time and to select the second virtual image capture device at the second time. The controller is configured to instruct the sensor to capture image data according to a selection of the scheduler.

An aspect of some embodiments of the invention comprises a tracker configured to identify one or more features in image data captured by the sensor. Such features may include human faces, vehicle license plates, areas of motion, and the like. In some embodiments, the controller is configured to instruct the sensor to capture image data from a subset of the image capture device's field of view in response to the tracker identifying at least one such feature. Additionally, or alternatively, the controller may be configured to instruct the sensor to capture image data according to at least one imaging parameter of a set of imaging parameters in response to the tracker identifying at least one of the one or more features.

In some embodiments, each virtual image capture device comprises one or more data elements and each imaging parameter associated with a virtual image capture device is represented by a data element of that virtual image capture device. Some embodiments comprise a common data store represented in the memory. The common data store may comprise at least one data element accessible by at least two of the plurality of virtual image capture devices.

In an example embodiment of the invention, the first virtual image capture device is configured to communicate information derived from image data captured by the first virtual image capture device to the second virtual image capture device. The second virtual image capture device may be configured to modify one or more imaging parameters of the set of imaging parameters associated with the second virtual image capture device in response to receiving the derived information.

An aspect of the invention provides an image capture system. The image capture system comprises an image capture device according to any one of the above aspects, and a processor in communication with the controller of the image capture device over a data link. The controller of the image capture device is configured to transmit at least one of the first image data and the second image data to the processor.

Another aspect of the invention provides a plurality of profiles represented in a second memory. At least one profile is associated with at least one virtual image capture device, the processor is in communication with the second memory, and each profile of the plurality of profiles comprises configuration settings. The processor may be configured to communicate the configuration settings of at least one profile to at least one virtual image capture device.

In some embodiments, the processor is configured to provide to the user a plurality of views, each view corresponding to a virtual image capture device and configured to display image data captured by said virtual image capture device.

Some aspects of the invention provide a plurality of image capture devices in communication with the processor, each image capture device configured to transmit image data to the processor over the data link.

In some embodiments, the controller is configured to modify at least one imaging parameter of the first and second sets of imaging parameters in response to a selection from a user. The invention may be configured to provide a user interface providing controls configured to allow user selection of one or more of the imaging parameters of the first and second sets of imaging parameters.

In some embodiments, at least one imaging parameter of the first and second sets of imaging parameters comprises a region of interest, exposure, and/or shutter speed.

Further aspects and example embodiments are illustrated in the accompanying drawings and/or described in the following description.

BRIEF DESCRIPTION OF DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

This invention provides cameras and other image capture devices and systems for use with such devices. The cameras or other image capture devices comprise multiple virtual imaging devices. Each virtual imaging device may operate independently of others and may provide its own completely independent set of imaging parameters. The available imaging parameters may vary between implementations but may include parameters such as exposure, ISO, depth of field (e.g. aperture), shutter speed, data depth (e.g. 8-bit or 12-bit) region(s) of interest, colour/monochrome, illumination, focus, zoom, aperture, pan-tilt position, and the like. Some alternative embodiments provide defined interactions between imaging parameters for different virtual cameras. Example embodiments may be applied to obtain a plurality of sequences of images, each sequence obtained using imaging parameters selected for a different application using a single physical imaging device. In some such embodiments the physical imaging device may be functionally equivalent to a plurality of separate physical imaging devices.

Figure 1:
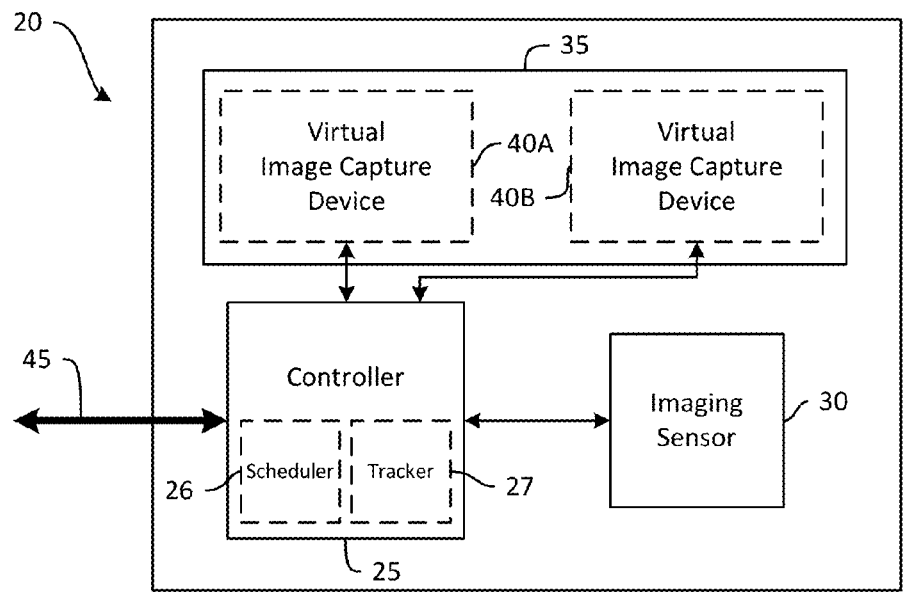
FIG. 1 is a schematic view of an example image capture device.

FIG. 1 shows schematically an example image capture device 20. An image capture device 20 has a controller 25 in communication with an imaging sensor 30. The controller 25 is also in communication with a first memory 35. First memory 35 is encoded with, among other things, virtual image capture devices 40A and 40B (collectively 40). Image capture device 20 has a data link 45 by which controller 25 may be in communication with a network or device.

In operation, controller 25 controls imaging sensor 30 so as to cause imaging sensor 30 to capture one or more images using imaging parameters of a first virtual image capture device 40A. Controller 25 may subsequently cause sensor 30 to capture one or more additional images according to imaging parameters of a second virtual image capture device 40B. An image captured according to imaging parameters of a virtual image capture device 40 can be said to have been captured by virtual image capture device 40. The images may then be stored in first memory 35 or some other storage medium (such as an SD card, not shown), communicated on data link 45, processed somehow, or some combination of these.

Each virtual image capture device comprises data and/or instructions that specify imaging parameters for acquiring images. A virtual image capture device may optionally also comprise data and/or instructions for controlling the processing of acquired images, the way acquired images are extracted from image sensor 30, causing acquisition of a specified sequence of images, controlling the transmission and/or storage of acquired images and the like. The behavior of image capture device 20 may be changed by switching among virtual image capture devices.

Figure 4:
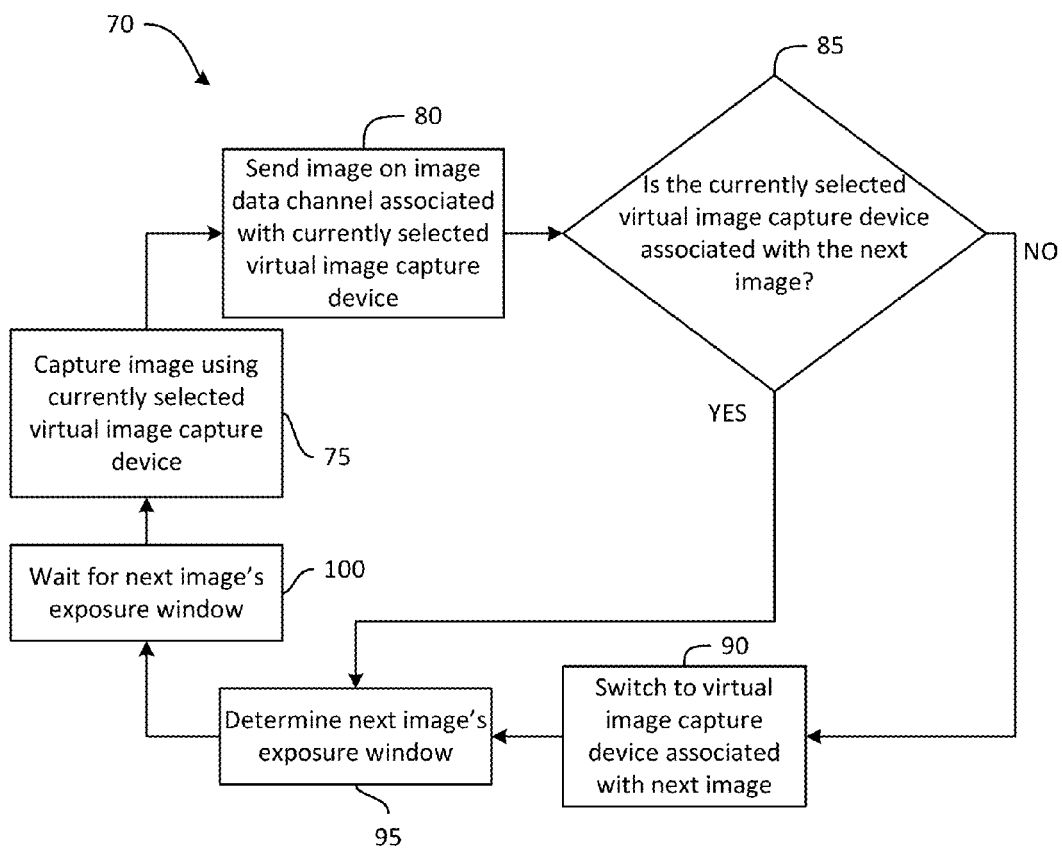
FIG. 4 is a flowchart depicting an example process of capturing images using the associated virtual image capture device.

FIG. 4 is a flowchart showing an example image capture method 70. Image capture method 70 is performed by a controller 25. In step 75 an image is captured using the currently selected virtual image capture device 40. Controller 25 then performs a step 80, comprising sending the image captured in step 75 on a data channel 120 that is associated with the currently-selected virtual image capture device 40. Controller 25 then performs a step 85, comprising testing whether the currently selected virtual image capture device 40 is associated with the next image that is scheduled to be taken. If it is not, then controller 25 then proceeds to perform step 90, comprising selecting a different virtual image capture device 40, such as second virtual image capture device 40B. The newly-selected virtual image capture device 40 is associated with the next image scheduled to be taken. Controller 25 then proceeds to step 95. Step 95 comprises determining the time which the next image should be captured. Since images are not captured instantaneously, but rather are exposed over a period of time, fifth step 95 may comprise determining when exposure of the next image must begin, when exposure of the next image must end, or determining the range of times during which exposure must occur. Having determined this, controller 25 proceeds to step 100, comprising waiting for the time determined in the step 95 to arrive. When that time does arrive, controller 25 proceeds to step 75 and continues the process of capturing images and transmitting them according to the appropriate virtual image capture device 40.

Methods as described herein may be implemented in various ways. For example, one could configure a camera with virtual image capture devices to acquire images using each one of the virtual image capture devices in turn or according to other one or more predetermined sequences to yield streams of images. Each stream of images may be acquired by a virtual camera having a separate control loop for exposure or other imaging parameter(s). The control loop for one virtual image capture device may be independent of corresponding control loops for other ones of the virtual imaging devices. As another example, a camera may be configured to acquire a sequence of images using imaging parameters of a first virtual imaging device and to interrupt the sequence periodically or at specified times to obtain one or more images using another virtual imaging device.

In some embodiments in which each virtual image capture device 40 uses a separate control loop, "auto" behavior of image capture device 20 while acquiring images with one virtual image capture device 40 may be based on a history of images captured by the same virtual image capture device 40 (and not images captured by other virtual image capture devices 40). For example, image capture device 20 may analyze one or more previously-captured images captured by virtual image capture device 40A when calculating the appropriate exposure settings (e.g. shutter speed) for a subsequent image to be captured with virtual image capture device 40A. Those previous images may be analyzed even if more recent images have been captured by other virtual image capture device 40B. In some embodiments, image capture device 20 may also, or alternatively, analyze images captured by different virtual image capture devices.

In some embodiments, virtual image capture device 40A may maintain an internal state that is stored independently from the internal state of virtual image capture device 40B. The internal state of a virtual image capture device 40 may comprise information copied or derived from images and/or sensor readings captured with that given virtual image capture device 40. Separately maintaining the internal state for each virtual image capture device 40 may facilitate the implementation and/or execution of the separate control loops described above. Such internal state may, for example, be stored in data elements 50, which are described in greater detail below. Alternatively, or in addition, each virtual image capture device 40 may maintain an independent buffer for retaining internal state and/or other information.

In some embodiments, each virtual image capture device 40 can include an auto control loop (i.e. a control loop for performing auto behavior). Each auto control loop may comprise software running on a controller 25 processing state information (such as internal state information) for the associated virtual image capture device 40. The state information may be based at least in part on image data for images previously captured by that virtual image capture device 40. In some embodiments the state information is independent of the image data captured by other virtual image capture devices 40 and of the state information of other virtual image capture devices 40.

In some embodiments, controller 25 is configured to implement a scheduler 26. Scheduler 26 schedules the selection of virtual image capture devices 40, the capturing of images and the sending of captured images. Scheduler 26 may also schedule any other actions to be performed by controller 25 or components that controller 25 is in communication with. For example, scheduler 26 may be configured to perform all or part of method 70. In other embodiments, virtual image capture devices 40 store data elements 50 indicating when another virtual image capture device 40 should be selected, and may also indicate which virtual image capture device 40 is to be selected. In at least these latter embodiments, selection of virtual image capture devices 40 can optionally be performed without the aid of a separate scheduler 26. In further embodiments, virtual image capture devices 40 may be selected according to dynamic events. In some embodiments these events correspond to features identified in images by a feature recognition system. For instance, if a person's face comes into view, processor 25 may recognize that an image includes an object that resembles a face and, in response, may automatically select a virtual image capture device 40 that is configured to enable image capture device 20 to capture images of or including persons' faces, those faces being more likely to be easily visible or distinguished (e.g. due to better exposure of the faces) relative to images captured by other virtual image capture devices 40.

In some embodiments, controller 25 is configured to implement a tracker 27. Tracker 27 examines previously-captured images of image capture device 20 and recognizes features towards which it has been directed. For instance, tracker 27 may be configured to recognize persons' faces and determine the approximate region within which persons' faces are located within the subject area. Tracker 27 may be configured to examine images captured by one or more virtual image capture devices 40, and may examine images for more than one type of feature—e.g. tracker 27 may examine images for both persons' faces and vehicles' license plates. In some embodiments, tracker 27 examines only images captured by a virtual image capture device 40 that has been configured to capture images of the whole subject area using balanced settings. Other features that a tracker 27 may track are areas of motion, underexposed or overexposed areas, areas in which a particular pattern appears, etc.

In some embodiments, one or both of scheduler 26 and tracker 27 may be implemented as software processes performed by a controller 25 comprising one or more processors (optionally, scheduler 26 and/or tracker 27 may be performed by different processors). In some embodiments, one or both of scheduler 26 and tracker 27 may be implemented at least partially in hardware, such as in custom circuitry, as is discussed in greater detail below. One or both of scheduler 26 and tracker 27 may be represented in first memory 35 or in another memory or computer readable medium in communication with controller 25.

Imaging sensor 30 is in communication with processor 25 and in particular may receive instructions from processor 25 and may communicate images captured by imaging sensor 30 to processor 25. Imaging sensor 30 may support a range of photographic variables as input, such as ISO, colour profiles, resolution, white balance, and so on, as it known in the art. Imaging sensor 30 may comprise a CCD, CMOS, APS, or other design, and may comprise any size or aspect ratio, such as APS-C, full frame, four thirds, or other configurations. Imaging sensor 30 may be a monochrome sensor or a colour sensor.

Virtual image capture devices 40 are configured so as to store one or more units of information relevant to capturing an image. As a simple example, first virtual image capture device 40A may encode an ISO of 200. Controller 25, having selected first virtual image capture device 40A as the active virtual capture device, accordingly instructs imaging sensor 30 to capture a first image with an ISO of 200. Controller 25 might later select second virtual image capture device 40B encoding, for example, an ISO of 1600, resulting in controller 25 instructing imaging sensor 30 to capture a second image with an ISO of 1600. In this manner, controller 25, by instructing imaging sensor 30 according to the selected virtual image capture device 40A or 40B, may cause images to be captured as if by 2 or more separately-configured image capture devices.

Another example of the above mode of operation involves the use of a "region of interest" associated with a virtual image capture device 40. A region of interest may be a static subset of a subject area (such as the lower half of the subject area), a range of rows and columns within the pixel area, or may be a dynamic subset of a subject area (such as an image area corresponding to a person's face, a vehicle license plate number or an area in which motion is detected) recognized by a tracker 27, as discussed above or by another feature recognition system.

Figure 2:
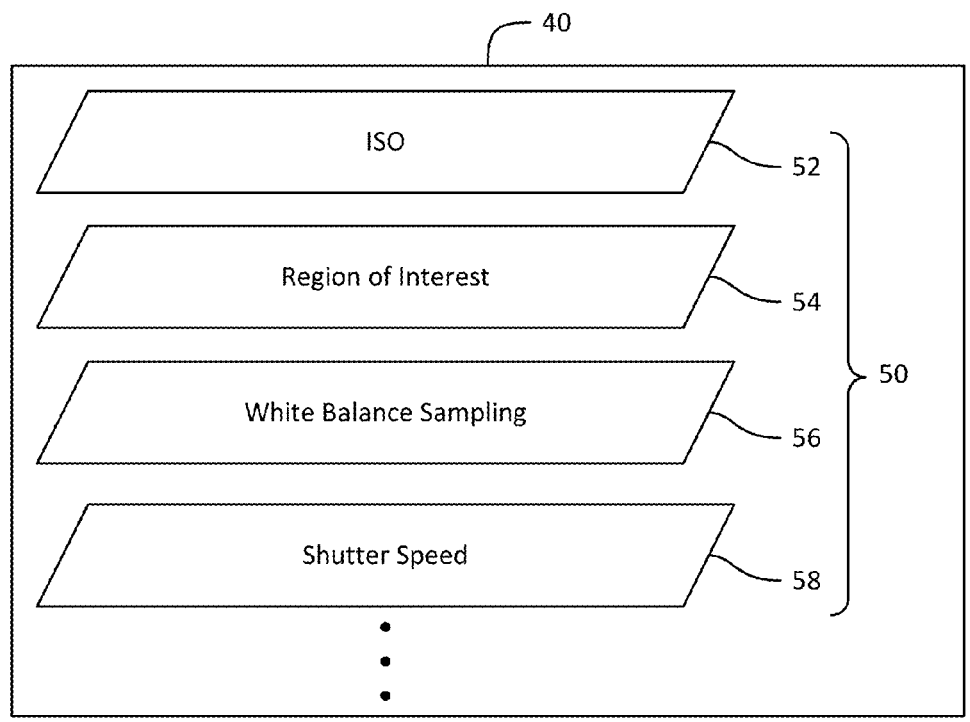
FIG. 2 is a logical view of a memory layout of an example virtual image capture device.

FIG. 2 shows logically an example memory layout of a virtual image capture device 40. In this example, virtual image capture device 40 has data elements 50. Virtual image capture device 40 may have additional data elements 50 other than those pictured, or only some of those pictured. These data elements 50 correspond generally to configuration information to be used by an image capture device 20. Any configuration information that might be used to control a sensor 30 and/or, more broadly, an image capture device 20 to acquire one or more images, can be represented in data elements 50.

In this way, successive images captured by image capture device 20 may be captured as if by differently-configured image capture devices, e.g. with different ISO levels, regions of interest, white balance sampling settings, shutter speed, exposure settings, illumination, focus, zoom, aperture, pan-tilt position, etc. As will be evident to one skilled in the art, imaging parameters such as illumination, focus, zoom, aperture, and pan-tilt position are not, in most embodiments, imaging parameters of sensor 30, and are instead typically associated with image capture device 20 and/or devices associated therewith. For example, illumination may be at least partially controlled by remote flash units, with which image capture device 20 is in communication. As another example, focus may be controlled by a lens; in some embodiments, image capture device 20 may use a liquid lens that allows for fast changes in focus, thereby allowing for fast switching between virtual image capture devices 40 with different focus parameters stored in data elements 50.

In some embodiments, a virtual image capture device encodes in region of interest data element 54 a region of the subject area that the captured image should be limited to or should use for control of exposure or other imaging parameters. In some embodiments, region of interest data element 54 encodes a static subset of the subject area (e.g. the lower half of the subject area). In other embodiments, region of interest data element 54 encodes a user-defined type of target, such as a person's face, a vehicle license plate or other visible entities capable of being recognized by tracker 27.

In response to selecting a virtual image capture device 40 storing a region of interest data element 54, controller 25 may, for example, instruct imaging sensor 30 to capture an image of the entire subject area using photographic variables (such as ISO and shutter speed) that are optimized for that particular region. Such optimization may be automatic, or may be defined by the other data elements 50 of virtual image capture device 40. Subsequently controller 25 may crop the captured image so that only the region of interest is retained. Alternatively, controller 25 may instruct imaging sensor 30 to capture an image of only those portions of the subject area which are contained in the region of interest indicated by region of interest data element 54, if imaging sensor 30 supports such functionality. In this way, images of a region of the subject area (such as a dark alcove in an otherwise brightly-lit hallway, or the face of a person who is walking toward the image capture device with the sun behind him or her) can be selectively captured and independently optimized for viewing.

Preferentially, optimization of an image for viewing comprises automatically calculating exposure settings with which to expose the region of interest based on images previously captured by the currently-selected virtual image capture device 40, light levels sensed by imaging sensor 30 in the region of interest (and not the light levels of the subject area outside of the region of interest), or both. This can be accomplished, for example, by associating with each virtual image capture device 40 an automatic exposure control loop that calculates exposure settings for the virtual image capture device 40, as described above. In some embodiments a control loop, for example, an automatic exposure control loop, for one virtual image capture device 40 may use information taken from images or regions within images acquired by other virtual image capture devices. This information may include, for example, exposure information, image histogram information, colour information, etc.

Other example data elements 50 that may be stored in a virtual image capture device 40 include resolution of an image to be captured, the colour profile of an image to be captured, the frame rate of a series of images to be captured, or other photographic configuration information as is known in the art. Virtual image capture device 40 may store one, some or all of the data elements 50 that are used by image capture device 20 to capture images.

Figure 3:
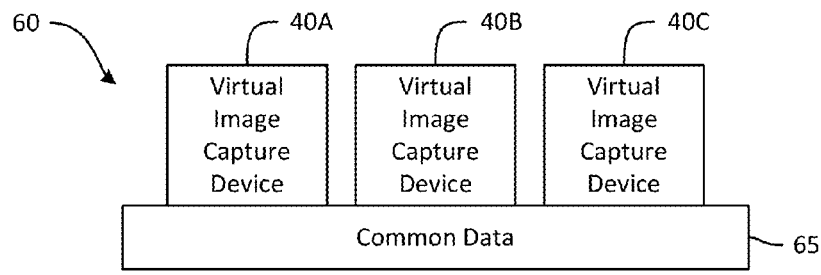
FIG. 3 is a block diagram showing an example partial memory layout of a virtual image capture device.

FIG. 3 shows an example partial memory layout 60 of an image capture device 20. Virtual image capture devices 40 are shown with distinct locations in memory, along with common data store 65, accessible by each virtual image capture device 40. Thus, in this example, each virtual image capture device 40 may store one or more data elements 50 that are represented distinctly from, and may be different from, the corresponding data elements 50 of the other virtual image capture devices.

In addition to the data elements 50 stored in virtual image capture devices 40 there may be a common data store 65 storing a set of data elements 50 that are common to each of the virtual image capture devices 40. In some embodiments, data elements 50 encode data that is specific to the image capture device implementing the virtual image capture devices 40 and is not expected to vary between virtual image capture devices 40. Such data elements may include the current focal length of a lens of the image capture device, if any, the date and time, the maximum aperture of the image capture device, or other photographic information that is dependent on the hardware of the image capture device or otherwise not variable between the virtual image capture devices.

Common data store 65 may also, or alternatively, store data elements 50 of the same type as those stored in virtual image capture devices 40. For instance, common data store 65 may store an ISO data element 52. Where a virtual image capture device 40 does not store a data element 50 of a particular type, controller 25 may instead by default use a data element 50 of that type from common data store 65, if such a data element 50 is stored in common data store 65. In some embodiments, when a selected virtual image capture device 40 stores a data element 50 of the same type as a data element 50 stored in common data store 65, processor 25 will use the data element 50 stored in the selected virtual image capture device 40. Note that, here, "type" refers to the information encoded in the data element—e.g. an ISO data element 52 encoding an ISO of 200 is of the same "type" as another ISO data element 52 encoding an ISO of 400.

In some embodiments, virtual image capture devices 40 may be further configured to analyze (and particularly, in many cases, to cause controller 25 to analyze) images captured by virtual image capture devices 40. The results of such analysis may optionally be communicated to other virtual image capture devices 40. Such communication may, for example, be effected by first virtual image capture device 40A placing the results of the analysis in first memory 35 at a location that is accessible by second virtual image capture device 40B. Such in-memory communication between virtual image capture devices 40 that are co-located in a first memory 35 may be fast and secure.

In an example embodiment, first virtual image capture device 40A is configured to capture images of the whole subject area using a long exposure time (i.e. a slow shutter speed), causing features in motion to induce blurring in the captured image. Controller 25 may then analyze the captured image for blurring and, having identified such blurring, the locations or patterns (or both) of the blurring may be communicated to second virtual image capture device 40B. Second virtual image device 40B may be configured to capture images of region(s) corresponding to the blurring. Second virtual image device 40B may, for example, be configured to process such region(s) to detect persons' faces (using the region of interest functionality discussed above), and may also be configured to restrict its region of interest to only those faces that are likely to be in motion based on the blurring information received from first virtual image capture device 40A. In such an embodiment, based on their relative unsuitability for viewing, images captured by first virtual image capture device 40A may be discarded without being stored or communicated for contemporaneous or later viewing.

The process of analyzing images captured by first virtual image capture device 40A and using the results to affect the way in which second virtual image capture device 40B captures images may be performed repeatedly by virtual image capture devices 40 and/or controller 25. In some embodiments, controller 25 is continually analyzing images captured by first virtual image capture device 40A and communicating the results of that analysis to second virtual image capture device 40B.

Although the Figures illustrate two or three virtual image capture devices 40 for the sake of simplicity, an image capture device 20 may have any number of virtual image capture devices 40, limited only by the capabilities of the particular hardware in use.

Data link 45 may be wireless, wired, direct, indirect (such as over a network, including LAN and WAN), physical, logical (such as where data link 45 comprises several discrete physical links, e.g. in a multihop network), or in any other configuration known to the art or later developed.

In some embodiments, images captured by image capture device 20 may be automatically optimized based on the view of image capture device 20 of the subject area captured in previous images taken according to the same or different virtual image capture devices 40, an ongoing live preview of the subject area or a subset thereof, or other pre- and post-capture image capture optimizations. Such automatic optimization may comprise automatically determining exposure, shutter speed or other photographic variables prior to capturing an image, or modifying, enhancing or adjusting an image after it has been captured.

In some embodiments, image capture device 20 is configured to select a virtual image capture device 40 other than the currently-selected virtual image capture device 40 after each image is captured. In other embodiments, a virtual image capture device 40 may be selected for several successive captured images. In at least this latter case, a different virtual image device 40 may be selected based on the time elapsed since the currently-selected virtual image device 40 was selected (a time-based selection), the number of images captured since the currently-selected virtual image device 40 was selected (an index-based selection), or the occurrence of some event, such as the recognition of a face or vehicle license plate by tracker 27 or the detection of motion in images acquired by the virtual image capture device 40, or an instruction being communicated to controller 25 over data link 45 to select a virtual image capture device 40 (an event-based selection).

In some embodiments, image capture device 20 is configured, through configuration of controller 25 and optionally scheduler 26, or through configuration of virtual image capture devices 40, to capture a plurality of images during every second of at least a portion of the operation of image capture device 20. In at least some embodiments, image capture device 20 is configured to capture a series of images at a high frame rate in the manner of a video camera. If image capture device 20 has N virtual image capture devices 40, image capture device 20 may select a different one of its N virtual image capture devices 40 for each successive image in a sequence of N images captured. Image capture device 20 may repeat this process, in some cases causing image capture device 20 to cycle through its virtual image capture devices 40 such that for each virtual image capture device 40, image capture device 20 captures an image with that virtual image capture device 40 every N images. Image capture device 20 may thus capture a plurality of video streams as if captured by N separately-configured video cameras.

In other embodiments, image capture device may capture multiple images with a virtual image capture device 40 in each cycle, resulting in a correspondingly higher frame rate for that virtual image device 40. For example, if an image capture device 20 has three virtual image capture devices 40A, 40B, and 40C, image capture device 20 might capture images in the following pattern: 40A, 40B, 40A, 40C. This would give the sequence of images captured by virtual camera 40A a faster frame rate than would be provided by a 40A, 40B, 40C pattern, although it slightly reduces the frame rates of virtual image capture devices 40B and 40C. This may be advantageous for certain uses, such as where virtual image capture device 40A captures images of a region of interest that frequently changes.

Figure 5:
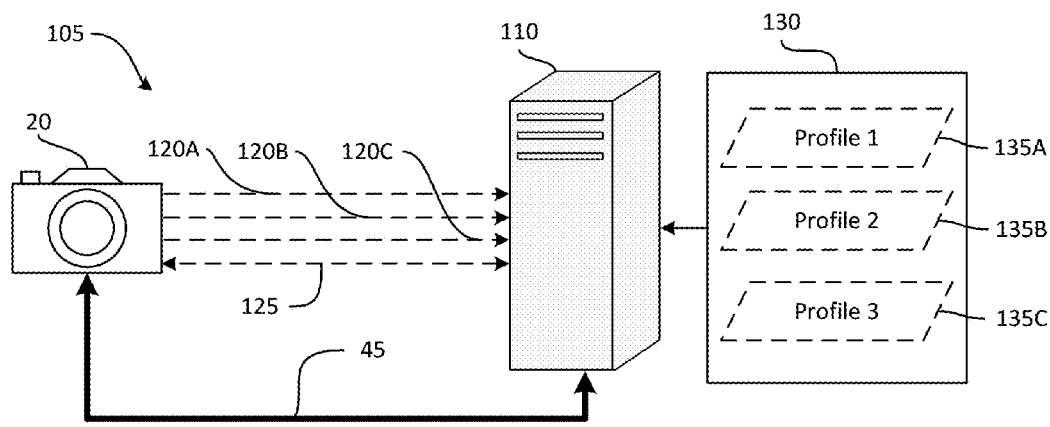
FIG. 5 is a schematic diagram of an example image capture device in communication with a computing device.

FIG. 5 shows schematically an example image capture system 105. In this example, an image capture device 20, configured as described above, is in communication with a processor 110 via a data link 45. Example image capture system 105 enables a user, via a processor 110 (which may be located remotely relative to image capture device 20) to configure virtual image capture devices 40 and receive from image capture device 20 multiple streams of captured images corresponding to virtual image capture devices 40. In this example, these streams of captured images are communicated over image data channels 120A, 120B, 120C (collectively "120"), and configuration information is communicated over control data channel 125. Image data channels 120 and control data channel 125 are carried over data link 45.

Each image data channel 120 is associated with a virtual image capture device 40. For example, images captured by image capture device 20 while first virtual image capture device 40A is selected may be communicated over data channel 120A. Similarly, images captured by virtual image capture device 40B may be communicated by controller 25 over image data channel 120B to processor 110, and so on.

In some embodiments, each virtual image capture device 40 appears to recipients of one or more image data channels 120 as a discrete image capture device with its own image data channel 120 carrying a stream of images specific to that virtual image capture device 40. This may be effected, for example, by assigning to each virtual image capture device 40 a unique identifier on a network. Such identifiers can comprise addresses in hardware (such as MAC addresses) and/or software (such as IP addresses and/or application-layer identifiers).

As an example of such an embodiment, one image capture device 20 with multiple virtual image capture devices 40 may appear to other devices connected to a network (such as, for example, an ad-hoc network, a local area network, the Internet, and/or other networks) as multiple, physically-separate image capture devices 20 (each corresponding to one virtual image capture device 40). Each virtual image capture device 40 may provide some or all of the network features (e.g. API calls) of an image capture device 20, thereby allowing other entities on the network to interact with the virtual image capture devices 40 as if they are distinct image capture devices 20. Instructions addressed to a particular identifier may result in the settings of the associated virtual image capture device 40 being modified accordingly. Although the instruction may be addressed to what is apparently an image capture device 20, the modifications may, in some embodiments, be confined to the virtual image capture device 40 associated with the identifier to which the instructions were addressed.

For example, each virtual image capture device 40 may be assigned a distinct IP address, and instructions sent to a particular virtual image capture device's 40 IP address may be received by and result in modifications to that virtual image capture device 40. In effect, each virtual image capture device 40 provides a distinct control interface associated with its identifier (in this case, an IP address). In such an example, image capture device 20 may have its own identifier and/or control interface (e.g. its own IP address and associated APIs). Instructions sent to image capture device 20 may, for example, result in modifications to common data store 65. Alternatively, or in addition, instructions sent to image capture device 20 may result in modifications to settings of image capture device 20 that are or are not represented by virtual image capture devices 40, such as orientation, focal length, and/or zoom.

In some embodiments, other entities on the network may not even be aware that the virtual image capture devices 40 are not physically-separate image capture devices 20. In those and/or other embodiments, virtual image capture devices 40 may provide the network features that are not provided by image capture device 20. In some embodiments, virtual image capture devices 40 provide features associated with image capture devices 20 other than the image capture device 20 with which they are associated. For example, a virtual image capture device 40 running on a particular model of security camera might emulate the API of a different model of security camera (or another type of image capture device 20).

Image data channels 120 may be directed towards different applications running on processor 110 or even, in an appropriately-configured network, to different processors. Image data channels 120 may, in some embodiments, each be directed to one or more processors or other image data recipients. Similarly, in some embodiments, processor 110 may be in communication with multiple image capture devices, some or all of them configured in the manner described above.

In some embodiments, a system permits a user of a processor 110 to control imaging parameters of one or more virtual image capture devices 40. For example, in a security camera system, a user may be able to manually adjust exposure, region of interest, or other parameters of one virtual image capture device 40 while other virtual image capture devices 40 continue to acquire images according to their imaging parameters.

Processor 110 preferably communicates profile or other configuration information with image capture device 20 over control data channel 125. Control data channel 125 may be unidirectional, from the processor 110 to image capture device 20, or bidirectional, allowing for the exchange of control information from processor 110 to image capture device 20 and vice-versa.

Although FIG. 5 shows one control data channel 125, there may be a plurality of control data channels 125. In some embodiments, each virtual image capture device 40 has an associated control data channel 125, analogous to image data channels 120 associated with virtual image capture devices 40. In embodiments where image capture device 20 is in communication with multiple processors 110, one image capture device 20 may communicate over a plurality of control data channels 125 with one or more processors 110. Similarly, in embodiments where processor 110 is in communication with multiple image capture devices 20, one processor 110 may communicate over a plurality of control data channels 125 with one or more image capture devices 20.

In some embodiments, virtual image capture devices 40 share information over a network. For example, virtual image capture devices 40 may send image data over image data channels 120 to processor 110, and processor 110 may send the image data or information derived from the image data to other virtual image capture devices 40. As another example, virtual image capture devices 40 may communicate to each other directly through direct connections between image capture devices 20. Each virtual image capture device 40 may, in some embodiments, appear to other devices on the network and/or other virtual image capture devices 40 on the same image capture device 20 as an independently-addressable device.

Processor 110 is in communication with a second memory 130. Second memory 130 stores, in this example, profiles 135A, 135B, 135C (collectively "135") corresponding to virtual image capture devices 40. Profiles 135 may be used to configure the virtual image capture devices 40. In particular, processor 110 may present to a user options for configuring virtual image capture devices 40 with which profiles 135 are associated. User configuration settings may be stored in profiles 135 and communicated to image capture device 20 over data link 45, and in particular over control data channel 125.

Reference to "configuring" virtual image capture devices 40 comprise creating new virtual image capture devices in first memory 35, changing values of data elements 50 such as data elements 50 in existing virtual image capture devices 40, adding new data elements 50 to existing virtual image capture devices 40, deleting data elements 50 or virtual image capture devices from first memory 35, or otherwise changing the contents of portions of first memory 35 which may be used to represent virtual image capture devices.

As noted above, image capture device 20 may have a plurality of virtual image capture devices 40 in excess of the two or three depicted. Similarly, processor 110 may be in communication with a plurality of image capture devices 20, and accordingly second memory 130 may have a number of profiles 135 in excess of the number of virtual image capture devices 40 on a given image capture device 20. Depending on the configuration of processor 110, a single profile 135 could optionally be associated with multiple virtual image capture devices 40, or could be associated with no image capture devices until a user chooses to so associate said profile 135 with one or more virtual image capture devices 40.

The use of profiles 135 is not the only way to configure virtual image capture devices 40; in other embodiments, image capture device 20 may provide means to configure virtual image capture devices 40. Virtual image capture devices 40 may come pre-configured, or may be configured via an automated method.

In one embodiment of image capture system 105, a plurality of image capture devices 20 are connected to a computer network. One or more computers comprising processors 110 and memory 130 are also connected to the computer network, and each of the image capture devices 20 is in communication with at least one of the processors 110 via at least one image data channel 120. A user may then view images captured by virtual image capture devices 40 via one or more processors 110, if the virtual image capture devices 40 are in communication with the one or more processors 110.

Each of the embodiments of an image capture device 20, discussed above, can be used in embodiments of image capture system 105. As a consequence, in some embodiments image capture devices 20 may comprise security cameras with high frame rates, and virtual image capture devices 40 may be configured to capture images of static regions of interest (such as dim hallway entrances) and dynamic regions of interest (such as faces or vehicle license plates in motion), allowing one or more users using one or more processors 110 to monitor a location with a plurality of high-quality (i.e. suitable for viewing) video feeds without having to install a corresponding plurality of security cameras.

Figure 6:
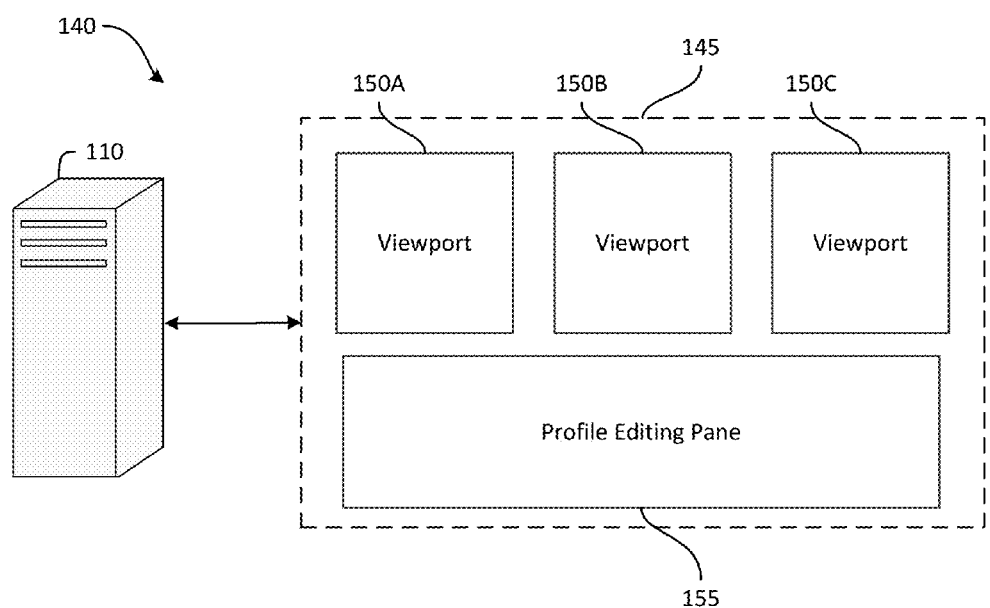
FIG. 6 is a schematic diagram of an example image displaying system.

FIG. 6 shows schematically an example image display system 140. Processor 110 provides a display 145, display 145 displaying viewports 150A, 150B, 150C (collectively "150"). Each of viewports 150 is associated with at least one image data channel 120. Viewports 150 display images communicated by image data channels 120 with which they are associated. Users can add, edit and delete profiles 135, as discussed above, by interacting with profile editing pane 155. These adjustments to profiles 135 are communicated to controller 25 by processor 110 and corresponding adjustments are made to first memory 35 by controller 25.

In one embodiment a user may view through viewports 150 multiple video feeds, one for each of the image data channels 120, enabling the user to view the subject area viewable by image capture device 20 as if receiving images from multiple image capture devices 20. This may be particularly advantageous if image capture device 20 is, for example, a security camera, preferably with a high frame rate, especially if image capture device 20 is viewing a subject area having regions with significant contrast or differences in lighting. In such an embodiment, image display system 140 may enable a user to view video feeds of various parts of the subject area as if taken from a greater number of image capture devices 20 than are, in fact, present.

One aspect of the invention provides an image capture system comprising: a controller in communication with a processor over a data link; a sensor in communication with the controller and configured to capture image data according to one or more imaging parameters; a memory accessible by the controller; and a plurality of virtual image capture devices represented in the memory, each virtual image capture device of the plurality of virtual image capture devices associated with a set of imaging parameters; wherein: the controller is configured to instruct the sensor to capture a first image data at a first time according to at least one imaging parameter of a first set of imaging parameters associated with a first virtual image capture device of the plurality of virtual image capture devices; the controller is configured to instruct the sensor to capture a second image data at a second time according to at least one imaging parameter of a second set of imaging parameters associated with a second virtual image capture device of the plurality of virtual image capture devices; and the controller is configured to transmit at least one of the first image data and the second image data to the processor over the data link.

Another aspect of the invention provides an image capture system according to the above aspect comprising a plurality of profiles represented in a second memory, at least one profile of the plurality of profiles associated with at least one virtual image capture device of the plurality of virtual image capture devices; wherein: the processor is in communication with the second memory; each profile of the plurality of profiles comprises configuration settings; and the processor is configured to communicate the configuration settings of at least one profile to at least one virtual image capture device of the plurality of virtual image capture devices.

Another aspect of the invention provides an image capture system according to either one of the above aspects wherein the processor is configured to provide to the user a plurality of views, each view corresponding to a virtual image capture device and configured to display image data captured by said virtual image capture device.

Another aspect of the invention provides an image capture system according to any of the above aspects and comprising a plurality of image capture devices in communication with the processor, each image capture device configured to transmit image data to the processor over the data link.

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "herein", "above", "below", and words of similar import, when used to describe this specification shall refer to this specification as a whole and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms;

"memory", "first memory", "second memory", and words of similar import are to be construed to include individual discrete memory devices, distributed memory systems comprising a plurality of discrete memory devices, locally-accessible memory, remotely-accessible memory, physical memory, and virtual memory;

further, "first memory" and "second memory" may comprise: distinct devices, locations, or systems; the same devices, locations, or systems; and/or overlapping devices, locations, or systems.

Where a component (e.g. a circuit, module, assembly, device, imaging sensor, controller, processor, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Certain implementations of the invention comprise processors which execute software instructions (including "firmware") which cause the processors to perform a method of the invention. For example, controller 25 in an image capture device 20 or processor 110 in an image capture system 105 may comprise one or more processors that implement methods for capturing images by executing software instructions in a program memory accessible to the processors. Such methods may also be performed by logic circuits which may be hard configured or configurable (such as, for example logic circuits provided by a field-programmable gate array "FPGA"). The invention may also be provided in the form of a program product. The program product may comprise any medium which carries a set of computer-readable instructions which, when executed by a data processor, cause the data processor to execute a method of the invention. Program products according to the invention may be in any of a wide variety of forms. The program product may comprise, for example, magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Software and other modules may be accessible via local memory, via a network, via a browser or other application, or via other means suitable for the purposes described herein. Examples of the technology can also be practised in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures (e.g., data elements 50) described herein may comprise computer files, variables, programming arrays, programming structures, or any electronic information storage schemes or methods, or any combinations thereof, suitable for the purposes described herein.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope. The scope of the claims should not be limited by the preferred embodiments set forth in the examples, but should be given the broadest interpretation consistent with the description as a whole.

What is claimed is:

1. An image capture device comprising:
    a sensor configured to capture image data according to one or more imaging parameters;
    a controller in communication with the sensor;
    a memory accessible by the controller;
    a first virtual image capture device, the first virtual image capture device associated with a first set of imaging parameters and a first internal state buffer; and
    a second virtual image capture device, the second virtual image capture device associated with a second set of imaging parameters and a second internal state buffer;
    wherein:
    the controller is configured to operate the sensor to capture a first set of image data with the first virtual image capture device, the first set of image data comprising a video sequence comprising a sequence of first images, said capturing of the first images of the first set of image data comprising instructing the sensor to capture image data according to:
        at least one imaging parameter of the first set of imaging parameters; and
        information stored in the first internal state buffer;
    the controller is configured to operate the sensor to capture a second set of image data with the second virtual image capture device, said capturing of the second set of image data comprising instructing the sensor to capture image data between two consecutive ones of the first images in the video sequence according to:
        at least one imaging parameter of the second set of imaging parameters; and
        information stored in the second internal state buffer;
    the controller is configured to store information associated with at least a portion of the first set of image data in the first internal state buffer; and
    the controller is configured to store information associated with at least at least a portion of the second set of image data in the second internal state buffer.

2. The image capture device according to claim 1 comprising a scheduler configured to select the first virtual image capture device at a first time and to select the second virtual image capture device at a second time, wherein the controller is configured to instruct the sensor to capture the first and second sets of image data according to a selection of the scheduler.

3. The image capture device according to claim 2 wherein the image capture device is configured to identify one or more features in the first set of image data captured by the sensor, and the second time is a function of a time when the one or more features are identified.

4. The image capture device according to claim 3 wherein at least one of the one or more features comprises a human face.

5. The image capture device according to claim 3 wherein at least one of the one or more features comprises a vehicle license plate.

6. The image capture device according to claim 3 wherein at least one of the one or more features comprises an area of motion, the first and second sets of imaging parameters comprise a first and second shutter speed, and the controller is configured to operate the second virtual image capture device to capture image data according to the second set of imaging parameters, and where the second shutter speed is shorter than the first shutter speed.

7. The image capture device according to claim 3 wherein the controller is configured to operate the second virtual image capture device to capture image data from a subset of the first virtual image capture device's field of view in response to the image capture device identifying at least one of the one or more features.

8. The image capture device according to claim 3 wherein the controller is configured to capture image data with the second virtual image capture device from a portion of the first virtual image capture device's field of view in response to the image capture device identifying at least one of the one or more features.

9. The image capture device according to claim 3 comprising a tracker configured to identify one or more features in the first set of image data captured by the sensor, and modify the second set of imaging parameters in response to identifying the one or more features.

10. The image capture device according to claim 1 wherein each of the first and second virtual image capture devices comprises one or more data elements and each imaging parameter associated with a virtual image capture device is represented by a data element of that virtual image capture device.

11. The image capture device according to claim 10 comprising a common data store represented in the memory, the common data store comprising at least one data element accessible by each of the first and second virtual image capture devices.

12. The image capture device according to claim 1 wherein the first virtual image capture device is configured to communicate information derived from the first set of image data to the second virtual image capture device; and the second virtual image capture device is configured to modify one or more imaging parameters of the second set of imaging parameters in response to receiving the derived information.

13. The image capture device according to claim 1 wherein the controller is configured to modify at least one imaging parameter of the first and second sets of imaging parameters in response to a selection from a user.

14. The image capture device according to claim 1 comprising a user interface providing controls configured to allow user selection of one or more of the imaging parameters of the first and second sets of imaging parameters.

15. The image capture device according to claim 1 wherein at least one imaging parameter of the first and second sets of imaging parameters comprises a region of interest.

16. The image capture device according to claim 1 wherein at least one imaging parameter of the first and second sets of imaging parameters comprises exposure.

17. The image capture device according to claim 1 wherein at least one imaging parameter of the first and second sets of imaging parameters comprises shutter speed.

18. An image capture system comprising:
   an image capture device according to claim 1; and
   a processor in communication with the controller of the image capture device over a data link;
   wherein the controller of the image capture device is configured to transmit at least one of the first set of image data and the second set of image data to the processor.

19. An image capture method performed by a controller in communication with a sensor and a memory, the memory representing a first virtual image capture device associated with a first set of imaging parameters and a first internal state buffer, and the memory representing a second virtual image capture device associated with a second set of imaging parameters and a second internal state buffer, the method comprising:
   instructing the sensor to capture a first set of image data, the first set of image data comprising a video sequence comprising a sequence of first images, according to:
      at least one imaging parameter of the first set of imaging parameters; and
      information stored in the first internal state buffer;
   storing information associated with at least a portion of the first set of image data in the first internal state buffer;
   instructing the sensor to capture image data at a second time between two consecutive ones of the first images in the video sequence according to:
      at least one imaging parameter of the second set of imaging parameters; and
      information stored in the second internal state buffer; and
   storing information associated with at least a portion of the second set of image data in the second internal state buffer.

20. The image capture method according to claim 19 comprising, at a scheduler, selecting the first virtual image capture device at a first time and selecting the second virtual image capture device at a second time; wherein instructing the sensor to capture the first and second sets of image data comprises instructing the sensor to capture image data according to a selection of the scheduler.

21. The image capture method according to claim 19 comprising identifying one or more features in the first set of image data captured by the sensor.

22. The image capture method according to claim 21 wherein at least one of the one or more features comprises a human face.

23. The image capture method according to claim 21 wherein at least one of the one or more features comprises a vehicle license plate.

24. The image capture method according to claim 21 wherein at least one of the one or more features comprises an area of motion.

25. The image capture method according to claim 21 comprising, in response to identifying at least one of the one or more features, instructing the sensor to capture image data from a subset of the image capture device's field of view.

26. The image capture method according to claim 21 comprising, in response to identifying at least one of the one or more features, instructing the sensor to capture image data according to at least one imaging parameter of a set of imaging parameters.

27. The image capture method according to claim 19 comprising communicating information derived from image data captured by the first virtual image capture device to the second virtual image capture device; and, in response to receiving the derived information, modifying one or more imaging parameters of the set of imaging parameters associated with the second virtual image capture device.

28. The image capture method according to claim 19 comprising modifying at least one imaging parameter of the first and second sets of imaging parameters in response to a selection from a user.

29. The image capture method according to claim 28 comprising providing controls configured to allow the user to select at least one imaging parameter of the first and second sets of imaging parameters.

30. The image capture method according to claim 19 wherein at least one imaging parameter of the first and second sets of imaging parameters comprises a region of interest.

31. The image capture method according to claim 19 wherein at least one imaging parameter of the first and second sets of imaging parameters comprises exposure.

32. The image capture method according to claim 19 wherein at least one imaging parameter of the first and second sets of imaging parameters comprises shutter speed.

33. An image capture device comprising:
a sensor configured to capture image data according to one or more imaging parameters;
a controller in communication with the sensor;
a memory accessible by the controller;
a first virtual image capture device represented in the memory, the first virtual image capture device associated with a first set of imaging parameters;
a second virtual image capture device represented in the memory, the second virtual image capture device associated with a second set of imaging parameters; and
a data link for communicating with a network;
wherein:
the controller is configured to capture a first set of image data with the first virtual image capture device, the first set of image data comprising a video sequence comprising a sequence of first images, said capturing of the first images of the first set of image data comprising instructing the sensor to capture image data according to at least one imaging parameter of the first set of imaging parameters;
the controller is configured to capture a second set of image data with the second virtual image capture device, said capturing of the second set of image data comprising instructing the sensor to capture image data between two consecutive ones of the first images in the video sequence according to at least one imaging parameter of the second set of imaging parameters;
the controller is configured to communicate a first identifier associated with the first virtual image capture device to the network; and
the controller is configured to communicate a second identifier associated with the second virtual image capture device to the network, the second identifier different from the first identifier.

34. The image capture device according to claim 33 wherein the controller is configured to modify an imaging parameter of the first set of imaging parameters in response to receiving, over the data link, a communication addressed to the first virtual image capture device.

35. The image capture device according to claim 33 comprising a scheduler configured to select the first virtual image capture device at a first time and to select the second virtual image capture device at a second time, wherein the controller is configured to instruct the sensor to capture the first and second sets of image data according to a selection of the scheduler.

36. The image capture device according to claim 33 wherein the image capture device is configured to identify one or more features in the first set of image data captured by the sensor.

37. The image capture device according to claim 36 wherein at least one of the one or more features comprises a human face.

38. The image capture device according to claim 36 wherein at least one of the one or more features comprises a vehicle license plate.

39. The image capture device according to claim 36 wherein at least one of the one or more features comprises an area of motion.

40. The image capture device according to claim 36 wherein the controller is configured to instruct the sensor to capture image data from a subset of the image capture device's field of view in response to the image capture device identifying at least one of the one or more features.

41. The image capture device according to claim 36 wherein the controller is configured to capture image data with the second virtual image capture device in response to the image capture device identifying at least one of the one or more features.

42. The image capture device according to claim 36 comprising a tracker configured to identify one or more features in image data captured by the sensor.

43. The image capture device according to claim 33 wherein each of the first and second virtual image capture devices comprises one or more data elements and each imaging parameter associated with a virtual image capture device is represented by a data element of that virtual image capture device.

44. The image capture device according to claim 43 comprising a common data store represented in the memory, the common data store comprising at least one data element accessible by each of the first and second virtual image capture devices.

45. The image capture device according to claim 33 wherein the first virtual image capture device is configured to communicate information derived from the first set of image data to the second virtual image capture device; and the second virtual image capture device is configured to modify one or more imaging parameters of the second set of imaging parameters in response to receiving the derived information.

46. The image capture device according to claim 33 wherein the controller is configured to modify at least one imaging parameter of the first and second sets of imaging parameters in response to a selection from a user.

47. The image capture device according to claim 33 comprising a user interface providing controls configured to allow user selection of one or more of the imaging parameters of the first and second sets of imaging parameters.

48. The image capture device according to claim 33 wherein at least one imaging parameter of the first and second sets of imaging parameters comprises a region of interest.

49. The image capture device according to claim 33 wherein at least one imaging parameter of the first and second sets of imaging parameters comprises exposure.

50. The image capture device according to claim 33 wherein at least one imaging parameter of the first and second sets of imaging parameters comprises shutter speed.

51. An image capture system comprising:
    an image capture device according to claim 33; and
    a processor in communication with the controller of the image capture device over the data link;
    wherein the controller of the image capture device is configured to transmit at least one of the first set of image data and the second set of image data to the processor.

52. An image capture method performed by a controller in communication with a sensor and a memory, the memory representing a first virtual image capture device associated with a first set of imaging parameters and a second virtual image capture device associated with a second set of imaging parameters, and a data link for communicating with a network, the method comprising:
    instructing the sensor to capture a first set of image data, the first set of image data comprising a video sequence comprising a sequence of first images, according to at least one imaging parameter of the first set of imaging parameters;
    instructing the sensor to capture image data at a second time between two consecutive ones of the first images in the video sequence according to at least one imaging parameter of the second set of imaging parameters;
    communicating a first identifier associated with the first virtual image capture device to the network; and
    communicating a second identifier associated with the second virtual image capture device to the network, the second identifier different from the first identifier.

53. The image capture method according to claim 52 comprising, by a scheduler, selecting the first virtual image capture device at a first time and selecting the second virtual image capture device at a second time; wherein instructing the sensor to capture the first and second sets of image data comprises instructing the sensor to capture image data according to a selection of the scheduler.

54. The image capture method according to claim 52 comprising identifying one or more features in the first set of image data captured by the sensor.

55. The image capture method according to claim 54 wherein at least one of the one or more features comprises a human face.

56. The image capture method according to claim 54 wherein at least one of the one or more features comprises a vehicle license plate.

57. The image capture method according to claim 54 wherein at least one of the one or more features comprises an area of motion.

58. The image capture method according to claim 54 comprising, in response to identifying at least one of the one or more features, instructing the sensor to capture image data from a subset of the image capture device's field of view.

59. The image capture method according to claim 54 comprising, in response to identifying at least one of the one or more features, instructing the sensor to capture image data according to at least one imaging parameter of a set of imaging parameters.

60. The image capture method according to claim 52 comprising communicating information derived from image data captured by the first virtual image capture device to the second virtual image capture device; and, in response to receiving the derived information, modifying one or more imaging parameters of the set of imaging parameters associated with the second virtual image capture device.

61. The image capture method according to claim 52 comprising modifying at least one imaging parameter of the first and second sets of imaging parameters in response to a selection from a user.

62. The image capture method according to claim 61 comprising providing controls configured to allow the user to select at least one imaging parameter of the first and second sets of imaging parameters.

63. The image capture method according to claim 52 wherein at least one imaging parameter of the first and second sets of imaging parameters comprises a region of interest.

64. The image capture method according to claim 52 wherein at least one imaging parameter of the first and second sets of imaging parameters comprises exposure.

65. The image capture method according to claim 52 wherein at least one imaging parameter of the first and second sets of imaging parameters comprises shutter speed.

66. The image capture method according to claim 52 comprising modifying an imaging parameter of the first set of imaging parameters in response to receiving, over the data link, a communication addressed to the first virtual image capture device.

67. An image capture device comprising:
    an imaging sensor;
    a plurality of virtual image capture devices comprising at least a first virtual image capture device and a second virtual image capture device;
    a controller connected to operate the imaging sensor to acquire images comprising image data;
    the first virtual image capture device comprising a first set of one or more imaging parameters, the first virtual image capture device configured to provide a first automatic control loop;
    the second virtual image capture device comprising a second set of one or more imaging parameters, the second virtual image capture device configured to provide a second automatic control loop;
    the controller configured to acquire a video sequence comprising a first set of images using the first set of imaging parameters under control of the first automatic control loop; and
    the controller configured to acquire a second set of images between two consecutive ones of the first images in the video sequence using the second set of imaging parameters under control of the second automatic control loop;
    wherein the first automatic control loop is based on image data from the first set of images and the second automatic control loop is based on the second set of images.

68. The image capture device according to claim 1 wherein the second set of image data comprises a video sequence comprising a sequence of second images.

69. The image capture device according to claim 68 wherein the second images of the second video sequence are interleaved with the first images of the first video sequence.

70. The image capture device according to claim 2, wherein the second time is determined by the scheduler as a function of the first set of image data.

71. The image capture device according to claim 2, wherein the second time is determined by the scheduler as a function of the second set of imaging parameters.

72. The image capture device according to claim 2, wherein the first time is determined by the scheduler as a function of the second set of image data.

73. The image capture device according to claim 2, wherein the first time is determined by the scheduler as a function of the first set of imaging parameters.

74. The image capture device according to claim 1, wherein the controller is configured to modify at least one imaging parameter of the first and second sets of imaging parameters in response to one or both of the first image data and the second image data.

* * * * *